US012717818B2

(12) United States Patent
Jaltade et al.

(10) Patent No.: US 12,717,818 B2
(45) Date of Patent: Aug. 25, 2026

(54) PRE-PROCESSING METADATA FOR FASTER BACKGROUND DECISIONS

(71) Applicant: NUTANIX, INC., San Jose, CA (US)

(72) Inventors: Amod Vilas Jaltade, San Jose, CA (US); Harshit Agarwal, Fremont, CA (US); Igor Valeryevich Bashkirov, Sunnyvale, CA (US); Hitesh Bhagchandani, Bengaluru (IN); Hinal Gala, Santa Clara, CA (US); Rohit Jain, Cupertino, CA (US); Amol Vivek Kulkarni, Sunnyvale, CA (US); Tabrez Parvez Memon, Campbell, CA (US); Shantanu Potdar, San Jose, CA (US); Kiran Tatiparthi, Dublin, CA (US); Ashwin Thennaramvakkayil, Bengaluru (IN)

(73) Assignee: NUTANIX, INC., San Jose, CA (US)

( * ) Notice: Subject to any disclaimer, the term of this patent is extended or adjusted under 35 U.S.C. 154(b) by 0 days.

(21) Appl. No.: 18/898,263

(22) Filed: Sep. 26, 2024

(65) Prior Publication Data

US 2025/0355899 A1 Nov. 20, 2025

(51) Int. Cl.
*G06F 16/28* (2019.01)

(52) U.S. Cl.
CPC ................................. *G06F 16/285* (2019.01)

(58) Field of Classification Search
CPC .................................................... G06F 16/285
See application file for complete search history.

(56) References Cited

U.S. PATENT DOCUMENTS 8,473,566 B1 * 6/2013 Cardente ............... G06F 3/0653 709/215
8,549,518 B1 10/2013 Aron et al.
8,595,237 B1 11/2013 Chaudhary et al.
8,600,998 B1 12/2013 Chaudhary et al.
8,601,473 B1 12/2013 Aron et al.
8,850,130 B1 9/2014 Aron et al.
8,863,124 B1 10/2014 Aron
9,009,106 B1 4/2015 Aron et al.
9,069,708 B2 6/2015 Gill et al.
9,336,132 B1 5/2016 Aron et al.
9,652,265 B1 5/2017 Narayanasamy et al.
9,747,287 B1 8/2017 Bhardwaj et al.
9,772,866 B1 9/2017 Aron et al.
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Jay A Morrison
(74) *Attorney, Agent, or Firm* — Artegis Law Group, LLP

(57) ABSTRACT

Techniques for pre-processing metadata for faster background decisions include, in response to a metadata entry associated with storage of data in a cluster being modified, generating a summary entry corresponding to the metadata entry. The summary entry includes a subset of the information from the metadata entry. A data management action is performed based upon a scanning process that reads a plurality of summary entries corresponding to a plurality of metadata entries for data in the cluster.

36 Claims, 10 Drawing Sheets

(56) References Cited

U.S. PATENT DOCUMENTS

| | | | | |
|---|---|---|---|---|
| 9,946,716 | B2 | 4/2018 | Makkar et al. | |
| 2006/0265385 | A1 | 11/2006 | Agrawal et al. | |
| 2010/0161688 | A1* | 6/2010 | Kesselman | G06F 16/1844 707/813 |
| 2015/0113010 | A1 | 4/2015 | Muthyala et al. | |
| 2023/0401239 | A1* | 12/2023 | PerezLeon | G06F 16/2264 |

OTHER PUBLICATIONS

Poitras, Steven. “The Nutanix Bible” (Jan. 11, 2014), from http://stevenpoitras.com/the-nutanix-bible/ (Publication date based on indicated capture date by Archive.org; first publication date unknown); pp. all.
Poitras, Steven. “The Nutanix Bible” (Jun. 20, 2014), from http://stevenpoitras.com/the-nutanix-bible/ (Publication date based on indicated capture date by Archive. org; first publication date unknown); pp. all.
Poitras, Steven. “The Nutanix Bible” (Jan. 7, 2015), from http://stevenpoitras.com/the-nutanix-bible/ (Publication date based on indicated capture date by Archive.org; first publication date unknown); pp. all.
Poitras, Steven. “The Nutanix Bible” (Jun. 9, 2015), from http://stevenpoitras.com/the-nutanix-bible/ (Publication date based on indicated capture date by Archive. org; first publication date unknown); pp. all.
Poitras, Steven. “The Nutanix Bible” (Sep. 4, 2015), from https://nutanixbible.com/; pp. all.
Poitras, Steven. “The Nutanix Bible” (Jan. 12, 2016), from https://nutanixbible.com/ ; pp. all.
Poitras, Steven. “The Nutanix Bible” (Jun. 9, 2016), from https://nutanixbible.com/; pp. all.
Poitras, Steven. “The Nutanix Bible” (Jan. 3, 2017), from https://nutanixbible.com/; pp. all.
Poitras, Steven. “The Nutanix Bible” (Jun. 8, 2017), from https://nutanixbible.com/; pp. all.
Poitras, Steven. “The Nutanix Bible” (Jan. 3, 2018), from https://nutanixbible.com/; pp. all.
Poitras, Steven. “The Nutanix Bible” (Jun. 25, 2018), from https://nutanixbible.com/; pp. all.
Poitras, Steven. “The Nutanix Bible” (Jan. 8, 2019), from https://nutanixbible.com/; pp. all.
Poitras, Steven. “The Nutanix Bible” (Jul. 25, 2019), from https://nutanixbible.com/; pp. all.
Poitras, Steven. “The Nutanix Bible” (Sep. 17, 2019), from https://nutanixbible.com/; pp. all.
Cano, Ignacio et al. “Curator: Self-Managing Storage for Enterprise Clusters”; University of Washington; published Mar. 2017; pp. all.
Poitras, Steven. “The Nutanix Bible” (Mar. 2, 2020), from https://nutanixbible.com/; pp. all.
Poitras, Steven. “The Nutanix Bible” (Sep. 1, 2020), from https://nutanixbible.com/; pp. all.
Ctirix Validated Solutions, “Citrix XenDesktop 7.1 on Microsoft Hyper-V Server 2012 R2 on Nutanix Virtual Computing Platform Solution Design”, Prepared by: Citrix Validated Solutions, Jun. 25, 2014, 95 pages.
Poitras, Steven, The Nutanix Bible—Classic Edition, Sep. 26, 2024, 284 pages, https://www.nutanixbible.com/pdf/classic.pdf.
Laborie et al., “Managing and Querying Distributed Multimedia Metadata”, https://ieeexplore.ieee.org/document/6214724, 2009, 10 pages.
Singh et al., “A Metadata Catalog Service for Data Intensive Applications”, https://dl.acm.org/doi/10.1145/1048935.1050184, 2003, 17 pages.
Song et al., “Optimizing of metadata management in large-scale file systems”, https://link.springer.com/article/10.1007/s10586-018-2814-7, Dec. 29, 2017, 15 pages.
Agrawal, Kshitjia, “Contract Metadata Extraction The Ultimate Step-by-Step Guide”, https://www.spotdraft.com/blog/contract-metadata-abstraction, Mar. 6, 2023, 13 pages.
“Working with Record Summary Metadata” https://docs.oracle.com/cd/E41507_01/epm91pbr3/eng/epm/penw/task_WorkingwithRecordSummaryMetadata-991206.html, Apr. 6, 2024, 2 pages.
Candan et al., “Resource Description Framework Metadata and Its Applications”, https://www.kdd.org/exploration_files/candan.pdf, Jun. 4, 2024, 14 pages.
Versity, https://www.versity.com/products/scoutfs/, Sep. 26, 2024, 9 pages.
Liu et al., “SmartScan: Efficient Metadata Crawl for Storage Management Metadata Querying in Large File Systems”, • https://www.pdl.cmu.edu/PDL-FTP/Storage/CMU-PDL-10-112.pdf, 2010, 19 pages.
Veritas Data Insight Administrator’s Guide, https://www.veritas.com/support/en_US/doc/140216468-156145627-0/v71403819-156145627, Feb. 1, 2023.
Incremental garbage collection, https://docs.unity3d.com/Manual/performance-incremental-garbage-collection.html, 2022, 5 pages.

* cited by examiner

PRE-PROCESSING METADATA FOR FASTER BACKGROUND DECISIONS

CROSS-REFERENCE TO RELATED APPLICATIONS

This application claims the benefit of the India Provisional Patent Application titled "PRE-PROCESSING METADATA FOR FASTER BACKGROUND DECISIONS," filed May 15, 2024, and having Ser. No. 202441038116. The subject matter of this related application is hereby incorporated herein by reference.

BACKGROUND

Field of the Various Embodiments

Embodiments of the present invention relate generally to data management technologies, and more specifically, to techniques for pre-processing metadata for faster background decisions.

Description of the Related Art

The landscape of data storage has evolved progressively, from storage of data elements on sequential access technologies such as punch cards and magnetic tape to random access storage technologies. Data storage has also progressed from local storage to networked and cloud-based storage. Modern networked and cloud-based storage solutions can include many storage devices arranged in storage clusters.

Data management actions are performed on storage devices that are utilized for storage clusters to abstract the disk management actions away from the workloads and the virtual machines that utilize the storage clusters for data storage. As one example, a garbage collection process can periodically remove unused extent groups from storage devices. Data management actions typically require scanning the metadata of a storage device in order to make appropriate decisions about the data management actions should be performed, which can consume a significant amount of time and computing resources.

For example, in the case of a garbage collection process on storage-heavy clusters, the scanning of the metadata can require more time than the actual garbage collection process that is subsequently performed. In this scenario, the scan of the metadata becomes a bottleneck and slows the data management actions, which can cause performance of the data storage cluster to suffer.

As the foregoing indicates, what is needed in the art is more effective metadata processing technologies.

SUMMARY

The disclosed embodiments describe techniques for generating summary entries that correspond to metadata entries in a data storage cluster to facilitate data management actions. The techniques include generating summary entries that require less time and resources to scan or process so that data management actions can be performed without having to scan full or complete metadata entries corresponding to the storage devices.

In various embodiments, a non-transitory computer readable medium, comprises instructions that perform the steps of: in response to a metadata entry associated with storage of data in a cluster being modified, generating a summary entry corresponding to the metadata entry. The summary entry includes a subset of the information from the metadata entry. One or more data management actions are performed based upon a scanning process that reads a plurality of summary entries corresponding to a plurality of metadata entries for data in the cluster.

In various embodiments, a computer implemented method performs the steps of: in response to a metadata entry associated with storage of data in a cluster being modified, generating a summary entry corresponding to the metadata entry. The summary entry includes a subset of the information from the metadata entry. One or more data management actions are performed based upon a scanning process that reads a plurality of summary entries corresponding to a plurality of metadata entries for data in the cluster.

A system implements one or more aspects of the disclosed techniques by executing instructions that perform the steps of: in response to a metadata entry associated with storage of data in a cluster being modified, generating a summary entry corresponding to the metadata entry. The summary entry includes a subset of the information from the metadata entry. One or more data management actions are performed based upon a scanning process that reads a plurality of summary entries corresponding to a plurality of metadata entries for data in the cluster.

At least one technical advantage of the disclosed techniques relative to prior art is that, with the disclosed techniques, data management actions, such as garbage collection processes, can be performed faster and using fewer computing resources, enabling data management of clusters that store a greater amount of data relative to other technologies. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1A:
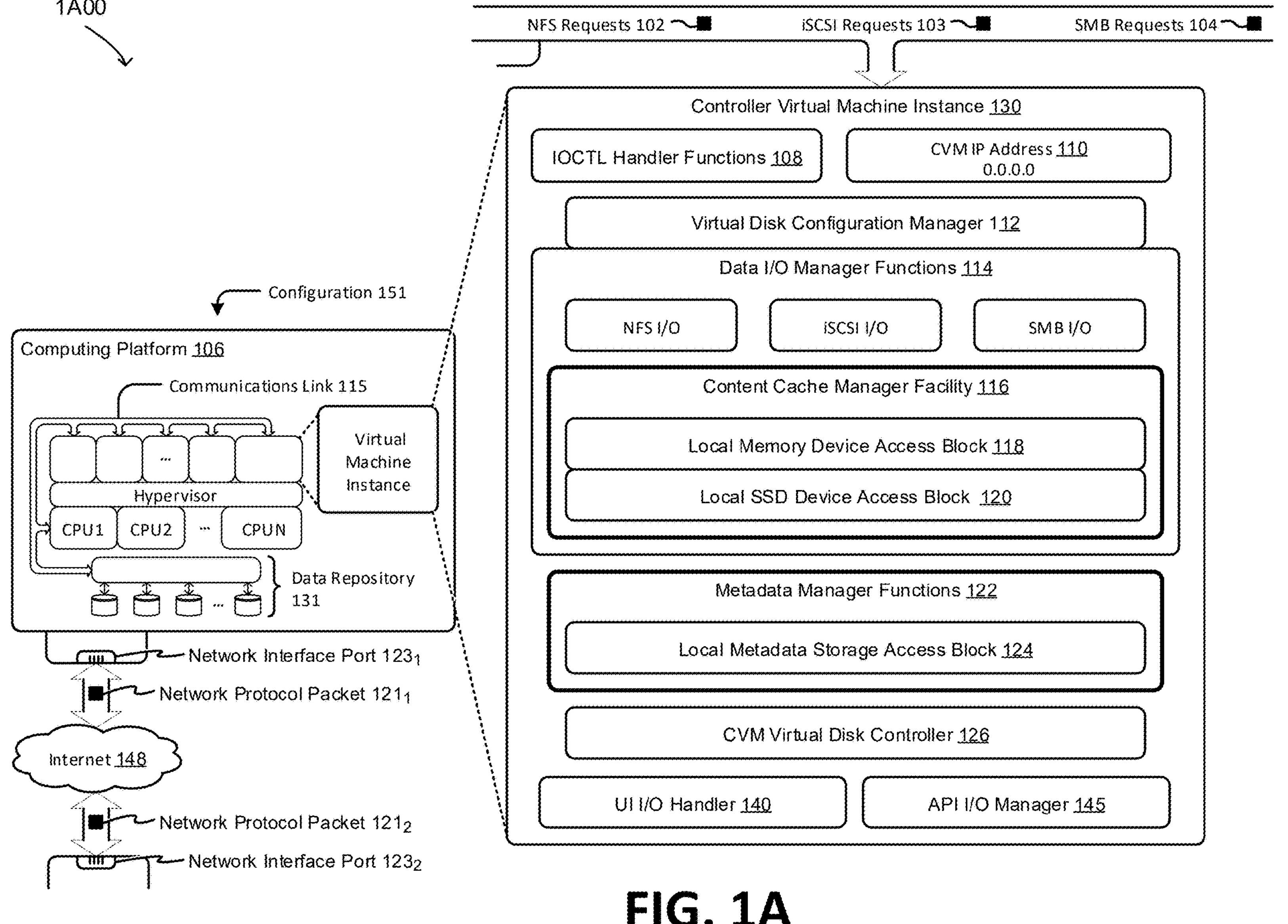
FIGS. 1A-1D are block diagrams illustrating virtualization system architectures configured to implement one or more aspects of the present embodiments.

In the following description, various concepts and examples are disclosed that provide more effective techniques for accessing business data using executable code included in authorization identifiers. The numerous specific details set forth will provide artisans with a more thorough understanding of the various embodiments. However, it will be apparent to one skilled in the art that the inventive concepts can be practiced without one or more of these specific details.

Exemplary Virtualization System Architectures

According to some embodiments, all or portions of any of the disclosed techniques can be partitioned into one or more modules and instances within, or as, or in conjunction with a virtualized controller in a virtual computing environment. Some example instances within various virtual computing environments are shown and discussed in further detail in FIGS. 1A-1D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage actions as well as being designed for, or dedicated to, computing and/or networking actions.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

FIG. 1A is a block diagram illustrating virtualization system architecture 1A00 configured to implement one or more aspects of the present embodiments. As shown in FIG. 1A, virtualization system architecture 1A00 includes a collection of interconnected components, including a controller virtual machine (CVM) instance 130 in a configuration 151. Configuration 151 includes a computing platform 106 that supports virtual machine instances that are deployed as user virtual machines, or controller virtual machines or both. Such virtual machines interface with a hypervisor (as shown). In some examples, virtual machines can include processing of storage I/O (input/output or IO) as received from any or every source within the computing platform. An example implementation of such a virtual machine that processes storage I/O is depicted as CVM instance 130.

In this and other configurations, a CVM instance receives block I/O storage requests as network file system (NFS) requests in the form of NFS requests 102, internet small computer storage interface (ISCSI) block IO requests in the form of iSCSI requests 103, Samba file system (SMB) requests in the form of SMB requests 104, and/or the like. The CVM instance publishes and responds to an internet protocol (IP) address (e.g., CVM IP address 110). Various forms of input and output can be handled by one or more IO control handler functions (e.g., IOCTL handler functions 108) that interface to other functions such as data IO manager functions 114 and/or metadata manager functions 122. As shown, the data IO manager functions can include communication with virtual disk configuration manager 112 and/or can include direct or indirect communication with any of various block IO functions (e.g., NFS IO, ISCSI IO, SMB IO, etc.).

In addition to block IO functions, configuration 151 supports IO of any form (e.g., block IO, streaming IO, packet-based IO, HTTP traffic, etc.) through either or both of a user interface (UI) handler such as UI IO handler 140 and/or through any of a range of application programming interfaces (APIs), possibly through API IO manager 145.

Communications link 115 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry can be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 106 includes one or more computer readable media that is capable of providing instructions to a data processor for execution. In some examples, each of the computer readable media can take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random-access persistent memories (RAPMs) or optical or magnetic media drives such as paper tape or magnetic tape drives. Volatile media includes dynamic memory such as random-access memory (RAM). As shown, controller virtual machine instance 130 includes content cache manager facility 116 that accesses storage locations, possibly including local dynamic random-access memory (DRAM) (e.g., through local memory device access block 118) and/or possibly including accesses to local solid-state storage (e.g., through local SSD device access block 120).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 131, which in turn can be formatted into any one or more storage areas, and which can comprise parameterized storage accessible by a key (e.g., a filename, a table name, a block address, an offset address, etc.). Data repository 131 can store any forms of data and can comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 124. The data repository 131 can be configured using CVM virtual disk controller 126, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, . . . , CPUN). According to certain embodiments of the disclosure, two or more instances of configuration 151 can be coupled by communications link 115 (e.g., backplane, LAN, PSTN, wired or wireless network, etc.) and each instance can perform respective portions of sequences of instructions as can be required to practice embodiments of the disclosure.

The shown computing platform 106 is interconnected to the Internet 148 through one or more network interface ports (e.g., network interface port $\mathbf{123}_1$ and network interface port $\mathbf{123}_2$). Configuration 151 can be addressed through one or more network interface ports using an IP address. Any operational element within computing platform 106 can perform sending and receiving operations using any of a range of network protocols, possibly including network protocols that send and receive packets (e.g., network protocol packet $\mathbf{121}_1$ and network protocol packet $\mathbf{121}_2$).

Computing platform 106 can transmit and receive messages that can be composed of configuration data and/or any other forms of data and/or instructions organized into a data structure (e.g., communications packets). In some cases, the data structure includes program instructions (e.g., application code) communicated through the Internet 148 and/or through any one or more instances of communications link 115. Received program instructions can be processed and/or executed by a CPU as it is received and/or program instructions can be stored in any volatile or non-volatile storage for later execution. Program instructions can be transmitted via an upload (e.g., an upload from an access device over the Internet 148 to computing platform 106). Further, program instructions and/or the results of executing program instructions can be delivered to a particular user via a download (e.g., a download from computing platform 106 over the Internet 148 to an access device).

Configuration 151 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT," issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT," issued on Oct. 1, 2013, which is hereby incorporated by reference in its entirety.

Figure 1B:
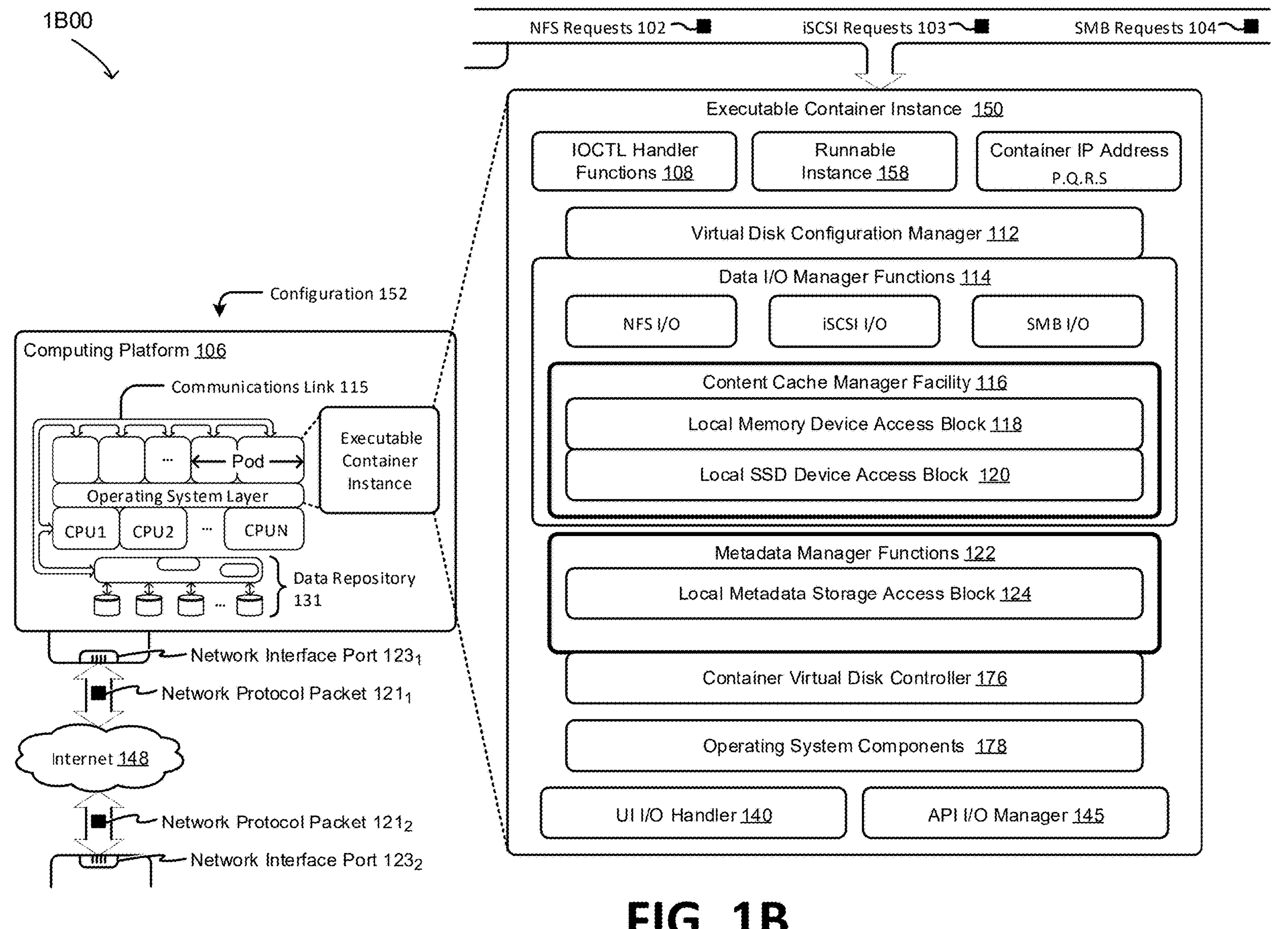

FIG. 1B depicts a block diagram illustrating another virtualization system architecture 1B00 configured to implement one or more aspects of the present embodiments. As shown in FIG. 1B, virtualization system architecture 1B00 includes a collection of interconnected components, including an executable container instance 150 in a configuration 152. Configuration 152 includes a computing platform 106 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node can communicate directly with storage devices on the second node.

The operating system layer can perform port forwarding to any executable container (e.g., executable container instance 150). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and can include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "Is" or "Is -a", etc.). The executable container might optionally include operating system components 178, however such a separate set of operating system components need not be provided. As an alternative, an executable container can include runnable instance 158, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 176. Such a container virtual disk controller can perform any of the functions that the aforementioned CVM virtual disk controller 126 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 1C:
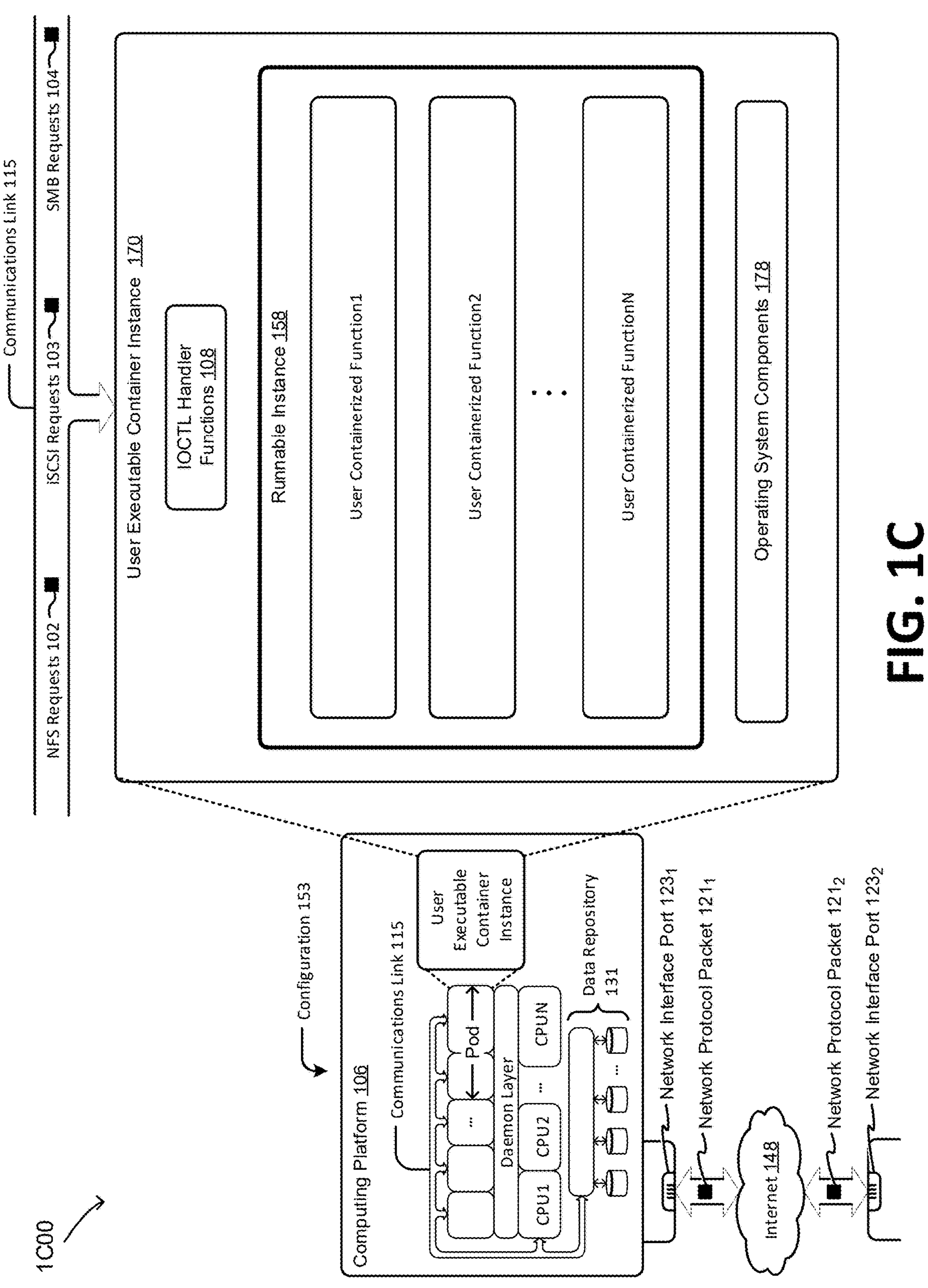

FIG. 1C is a block diagram illustrating virtualization system architecture 1C00 configured to implement one or more aspects of the present embodiments. As shown in FIG. 1C, virtualization system architecture 1C00 includes a collection of interconnected components, including a user executable container instance in configuration 153 that is further described as pertaining to user executable container instance 170. Configuration 153 includes a daemon layer (as shown) that performs certain functions of an operating system.

User executable container instance 170 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 158). In some cases, the shown operating system components 178 comprise portions of an operating system, which portions are interfaced with or included in the runnable instance and/or any user containerized functions. In some embodiments of a daemon-assisted containerized architecture, computing platform 106 might or might not host operating system components other than operating system components 178. More specifically, the shown daemon might or might not host operating system components other than operating system components 178 of user executable container instance 170.

In some embodiments, the virtualization system architecture 1A00, 1B00, and/or 1C00 can be used in any combination to implement a distributed platform that contains multiple servers and/or nodes that manage multiple tiers of storage where the tiers of storage might be formed using the shown data repository 131 and/or any forms of network accessible storage. As such, the multiple tiers of storage can include storage that is accessible over communications link 115. Such network accessible storage can include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 151) to manage the interactions between the underlying hardware and user virtual machines or containers that run client software.

Distinct from user virtual machines or user executable containers, a special controller virtual machine (e.g., as depicted by controller virtual machine instance 130) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 1D:
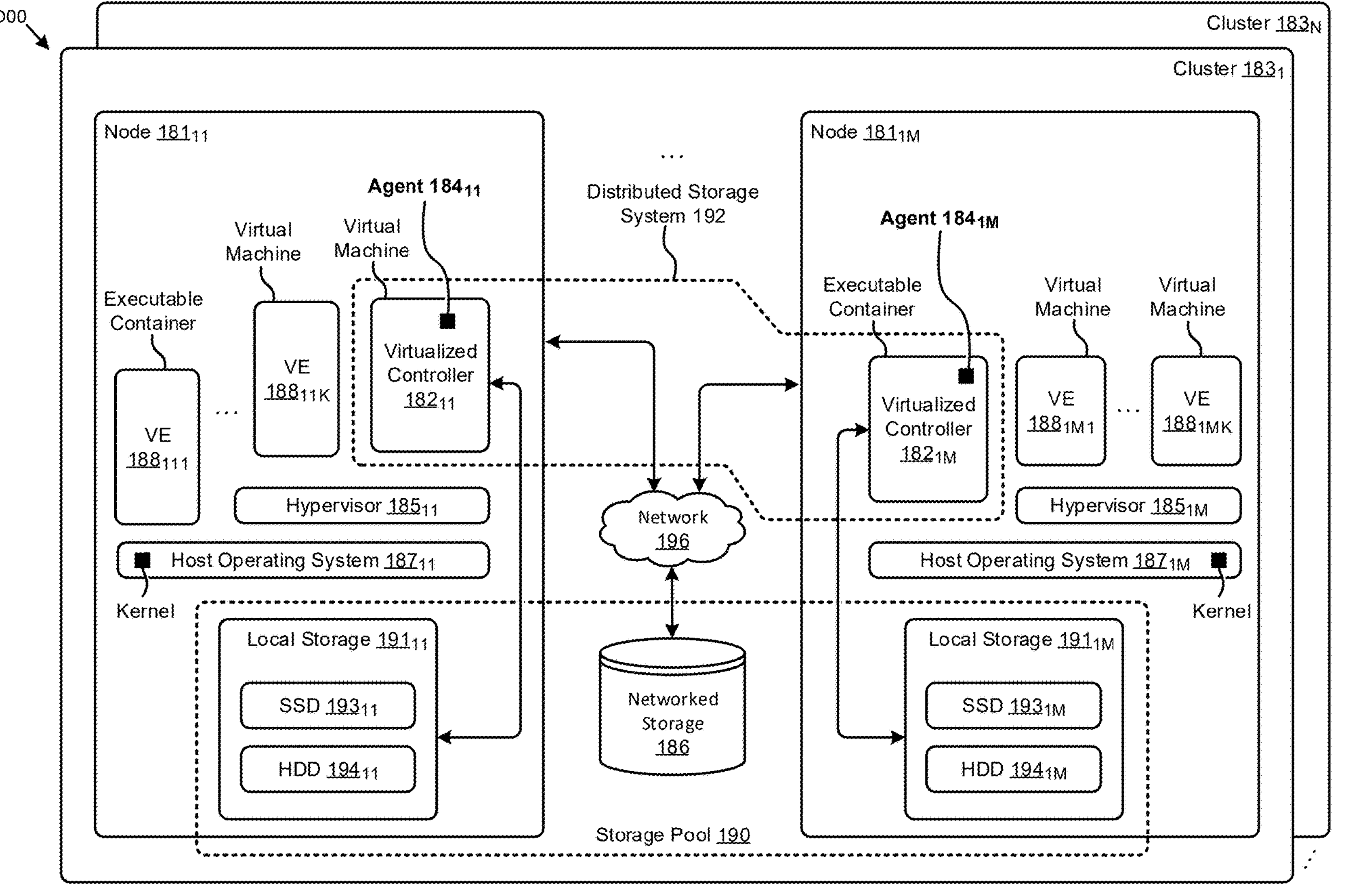

FIG. 1D is a block diagram illustrating virtualization system architecture 1D00 configured to implement one or more aspects of the present embodiments. As shown in FIG. 1D, virtualization system architecture 1D00 includes a distributed virtualization system that includes multiple clusters (e.g., cluster $\mathbf{183}_1$, . . . , cluster $\mathbf{183}_N$) comprising multiple nodes that have multiple tiers of storage in a storage pool. Representative nodes (e.g., node $\mathbf{181}_{11}$, . . . , node $\mathbf{181}_{1M}$) and storage pool 190 associated with cluster $\mathbf{183}_1$ are shown. Each node can be associated with one server, multiple servers, or portions of a server. The nodes can be associated (e.g., logically and/or physically) with the clusters. As shown, the multiple tiers of storage include storage that is accessible through a network 196, such as a networked storage 186 (e.g., a storage area network or SAN, network attached storage or NAS, etc.). The multiple tiers of storage further include instances of local storage (e.g., local storage $\mathbf{191}_{11}$, . . . , local storage $\mathbf{191}_{1M}$). For example, the local storage can be within or directly attached to a server and/or appliance associated with the nodes. Such local storage can include solid state drives (SSD $\mathbf{193}_{11}$, . . . , SSD $\mathbf{193}_{1M}$), hard disk drives (HDD $\mathbf{194}_{11}$, . . . , HDD $\mathbf{194}_{1M}$), and/or other storage devices.

As shown, any of the nodes of the distributed virtualization system can implement one or more user virtualized entities (e.g., VE $\mathbf{188}^{111}$, . . . , VE $\mathbf{188}^{11K}$, . . . , VE $\mathbf{188}^{1M1}$, . . . , VE $\mathbf{188}^{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $\mathbf{187}^{11}$, . . . , host operating system $\mathbf{187}^{1M}$), while the VMs run multiple applications on various respective guest operating systems. Such flexibility can be facilitated at least in part by a hypervisor (e.g., hypervisor $\mathbf{185}^{11}$, . . . , hypervisor $\mathbf{185}^{1M}$), which hypervisor is logically located between the various guest operating systems of the VMs and the host operating system of the physical infrastructure (e.g., node).

As an alternative, executable containers can be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system $187_{11}$, . . . , host operating system $187_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 190 by the VMs and/or the executable containers.

Multiple instances of such virtualized controllers can coordinate within a cluster to form the distributed storage system 192 which can, among other operations, manage the storage pool 190. This architecture further facilitates efficient scaling in multiple dimensions (e.g., in a dimension of computing power, in a dimension of storage space, in a dimension of network bandwidth, etc.).

In some embodiments, a particularly configured instance of a virtual machine at a given node can be used as a virtualized controller in a hypervisor-assisted virtualization environment to manage storage and I/O (input/output or IO) activities of any number or form of virtualized entities. For example, the virtualized entities at node $181_{11}$ can interface with a controller virtual machine (e.g., virtualized controller 18211) through hypervisor $185_{11}$ to access data of storage pool 190. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 192. For example, a hypervisor at one node in the distributed storage system 192 might correspond to software from a first vendor, and a hypervisor at another node in the distributed storage system 192 might correspond to a second software vendor. As another virtualized controller implementation example, executable containers can be used to implement a virtualized controller (e.g., virtualized controller $182_{1M}$) in an operating system virtualization environment at a given node. In this case, for example, the virtualized entities at node $181_{1M}$ can access the storage pool 190 by interfacing with a controller container (e.g., virtualized controller $182_{1M}$) through hypervisor $185_{1M}$ and/or the kernel of host operating system $187_{1M}$.

In some embodiments, one or more instances of an agent can be implemented in the distributed storage system 192 to facilitate the herein disclosed techniques. Specifically, agent $184_{11}$ can be implemented in the virtualized controller $182_{11}$, and agent $184_{1M}$ can be implemented in the virtualized controller $182_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or the agents.

Figure 2:
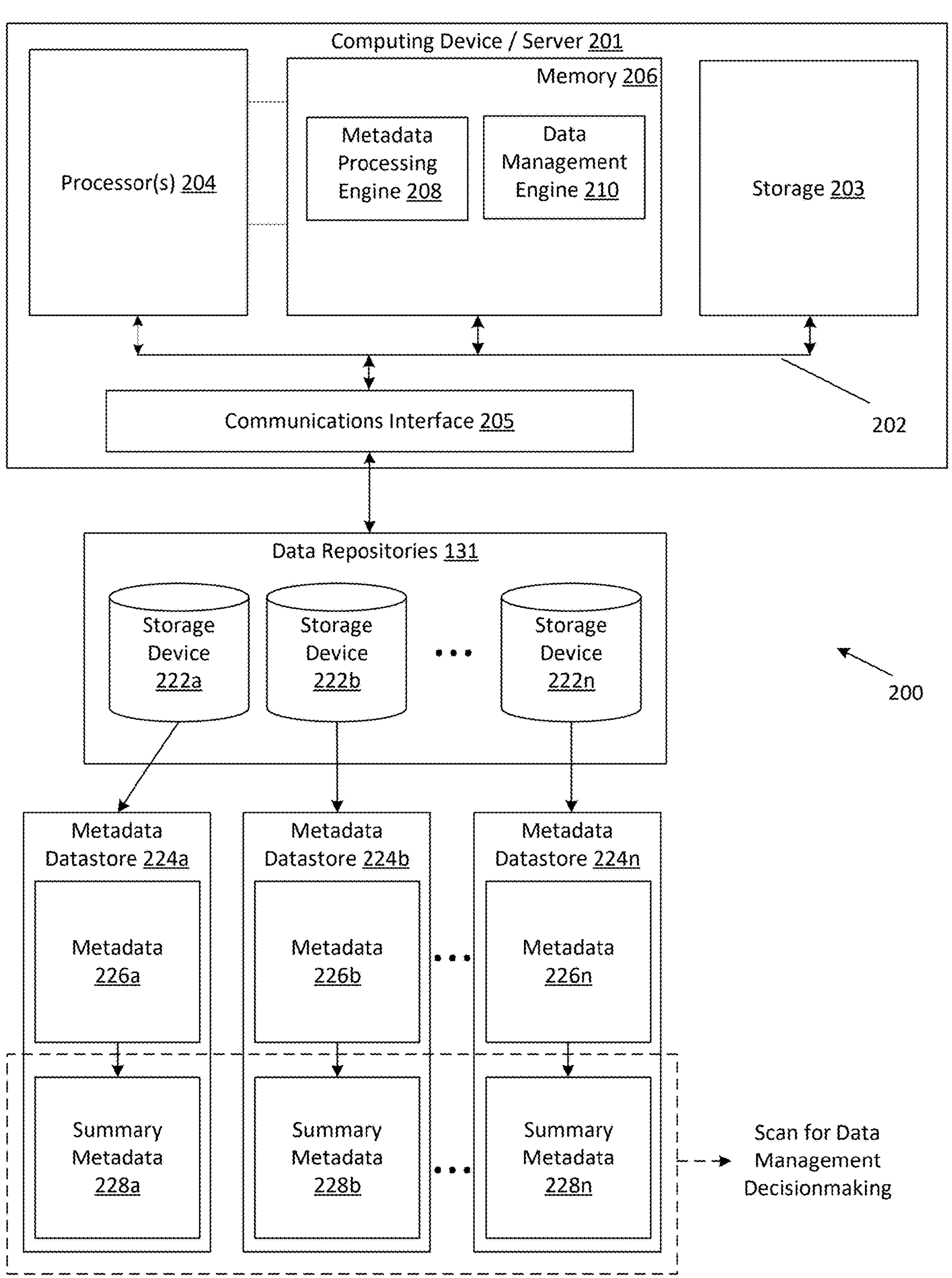
FIG. 2 is a block diagram illustrating a computing environment configured to implement one or more aspects of the present embodiments.

FIG. 2 is a block diagram illustrating a computing environment 200 configured to implement one or more aspects of the present embodiments. As shown, the computing environment 200 includes, without limitation, a computing device or server 201 and one or more data repositories 131. The server 201 includes, without limitation, a bus 202, storage 203, one or more processors 204, a communications interface 205, and a memory 206. Memory 206 includes, without limitation, a metadata processing engine 208 and a data management engine 210. The data repositories 131 include, without limitation, one or more storage devices 222*a*, 222*b* . . . 222*n* ("storage devices 222"). The storage devices 222 include, without limitation, one or more metadata datastores 224*a*, 224*b* . . . 224*n* ("metadata datastores 222"). The metadata datastores 224 include, without limitation, metadata 226*a*, 226*b* . . . 226*n* ("metadata 226"), and summary metadata 228*a*, 2268 . . . 228*n* ("summary metadata 228"). While metadata processing engine 208 and the data management engine 210 are shown in the memory 206, they can also be stored in the storage 203 and/or the data repositories 131. The components of the computing environment 200 of FIG. 2 can be included in any of the virtualization system architectures shown in FIGS. 1A-1D.

The bus 202 interconnects subsystems and devices within server 201, such as storage 203, the one or more processors 204, communications interface 205 and memory 206. The computing environment 200 described herein is illustrative and any other technically feasible configurations fall within the scope of the present disclosure. Further, in the context of this disclosure, the computing elements shown in the computing environment 200 can correspond to a physical computing system (e.g., a system in a data center) or can include a virtual computing instance.

Storage 203 includes, without limitation, non-volatile storage for applications and data, and may include one or more fixed or removable disk drives, HDDs, SSD, NVMes, vDisks, flash memory devices, and/or other magnetic, optical, and/or solid-state storage devices. In some examples, the storage 203 can be separate from the data repositories 131. However, the storage 203 can include one or more of the data repositories 131. The storage devices 222 include physical storage devices of a storage cluster. The storage devices 222 include, without limitation, non-volatile storage for applications and data, and may include one or more fixed or removable disk drives, HDDs, SSD, NVMes, vDisks, flash memory devices, and/or other magnetic, optical, and/or solid-state storage devices.

The one or more processors 204 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, one or more processors 204 can be any technically feasible hardware unit capable of processing data and/or executing software applications.

Memory 206 includes a random-access memory (RAM) module, a flash memory unit, and/or any other type of memory unit or combination thereof. The one or more processors 204 and/or communications interface 205 are configured to read data from and write data to memory 206. Memory 206 includes various software programs that include one or more instructions that can be executed by the one or more processors 204 and application data associated with said software programs.

The metadata processing engine 208 includes executable instructions such as a program or application. The metadata processing engine 208 maintains metadata datastores 224*a*, 224*b* . . . 224*n* ("datastores 224") for all, or a particular set of storage devices 222, such as storage devices 222 of a storage cluster. Each metadata datastore 224 stores metadata 226 summary metadata 228. The metadata datastore 224*a* stores metadata 226*a*. The metadata 226*a* includes metadata entries for a storage device 222*a*. The summary metadata 228*a* includes metadata entries that are generated based on a limited or predetermined subset of the metadata 226*a*. The metadata 226*b* includes metadata entries for a storage device 222*b*. The summary metadata 228*b* includes metadata entries that are generated based on a limited or predetermined subset of the metadata 226*b*. The metadata 226*n* includes metadata entries for a storage device 222*n*. The summary metadata 228*n* includes metadata entries that are generated based on a limited or predetermined subset of the metadata 226*n*. Accordingly, metadata processing engine 208 stores and maintains parallel sets of metadata entries as metadata 226 and corresponding summary metadata 228 for a predetermined set of data stored using the storage devices 222 of a storage cluster. The predetermined set of data is considered a complete set of data for the cluster. The set of metadata entries for the predetermined or complete set of data can be referred to as a complete set of metadata entries. The set of summary entries corresponding to the complete set of metadata entries can be referred to as a complete set of summary entries. In some embodiments, the metadata 226 includes or is limited to physical metadata. Physical metadata describes aspects of a physical resource, such as a storage device 222. This physical metadata includes metadata that describes the physical location and contents of specific subsets of the physical storage devices 222 of a storage cluster. Because the summary metadata 228 is generated based on metadata 226, the summary metadata 228 includes physical metadata among other types of metadata.

In one example, the metadata processing engine 208 generates parallel sets of metadata 226 and summary metadata 228 for a cluster of storage devices 222*a*, 222*b* 222*n*. The metadata processing engine 208 identifies metadata 226*a* for a physical storage device 222*a*. The metadata processing engine 208 extracts a subset of the metadata 226*a* and generates summary metadata 228*a*. The metadata processing engine 208 determines whether there is additional metadata 226 to process. In this example, the metadata processing engine 208 identifies that the metadata 226*b* for a physical storage device 222*b* is yet to be processed. The metadata processing engine 208 extracts a subset of the metadata 226*b* and generate summary metadata 228*b*. The metadata processing engine 208 continues processing metadata 226 until the metadata 226*a* to 226*n* is processed and the summary metadata 228*a* to 228*n* is generated and stored. The metadata processing engine 208 monitors the metadata 226 for the complete set of data stored using the storage devices 222 of the cluster for changes. If there is a change to any of the metadata 226, the metadata processing engine 208 can read the changed metadata 226 and update corresponding summary metadata 228.

The data management engine 210 includes executable instructions such as a program or application that makes data management decisions for the data repositories 131 and the physical storage devices 222. Data management decisions include garbage collection, lifecycle management, and other actions. Garbage collection includes identifying and reclaiming data areas within a storage device 222 when the data stored in that location is no longer needed or utilized according to data management rules. Lifecyle management includes moving data from one storage device 222 to another storage device 222 according to data management rules. For example, lifecycle management can include moving data that is infrequently used from an SSD to an HDD, moving data that is frequently used from an HDD to an SDD, and other data movement decisions.

The data management engine 210 makes data management decisions according to data management rules stored in the storage 203. The data management rules maps data management actions to one or more of: one or more values indicated in the summary metadata 228, and one or more storage parameters associated with various storage devices 222. Accordingly, the data management engine 210 identifies one or more data management actions based on the data management rules, the one or more values indicated in the summary metadata 228, and the one or more storage parameters associated with various storage devices 222. The storage parameters includes, without limitation, a read/write speed parameter, an access time parameter, a total capacity parameter, an available capacity parameter, a reliability parameter, and so on. The data management engine 210 associates each of the storage devices 222 in the memory 206 or the storage 203 with values for the various storage parameters. Some storage parameters are updated periodically, on a schedule, and in response to certain events.

The data management engine 210 generally reads the summary metadata 228 and identifies data management actions based on the metadata and the storage parameters for the storage devices 222. The data management actions include immediate data management actions that are permitted to be completed before a complete set of summary metadata 228 for a cluster is analyzed, and comprehensive data management actions that are completed once the complete set of summary metadata 228 for the cluster is analyzed. Immediate data management actions can include data management actions that are capable of being performed on data in a storage device 222 without moving other data, such as garbage collection actions and moving data to a currently unallocated physical location of a storage device 222. Comprehensive data management actions include data management actions that are identified based on comparisons between data management actions, ranking of data management actions, and so on. The comprehensive data management actions include data management actions that are identified based on comparisons between values indicated in different summary metadata 228 entries, ranking of values indicated in different summary metadata 228 entries, and so on.

The data management engine 210 can read and analyze summary metadata 228*a*. The data management engine 210 identifies whether the data management rules map the values indicated in the summary metadata 228*a* to any data management actions. In some examples, the data management engine 210 also identifies storage parameters for the storage devices 222, and determines whether the data management rules maps the storage parameters and the values indicated in the summary metadata 228*a* to any data management actions. If the data management actions for the summary metadata 228*a* include immediate data management actions, the data management engine 210 performs the immediate data management actions. The data management engine 210 performs immediate data management actions against the data stored in the storage devices 222 prior to reading and/or analyzing the complete set of the metadata 228 for the storage devices 222 of the cluster.

The data management engine 210 can determine whether there is additional summary metadata 228 to analyze. The data management engine 210 can identify the summary metadata 228*b*. The data management engine 210 reads and analyzes summary metadata 228*b*. The data management engine 210 identifies whether the data management rules maps the values indicated in the summary metadata 228*b* (and in some examples, the storage parameters for the storage devices 222) to any data management actions. If the data management actions for the summary metadata 228*b* include immediate data management actions, the data management engine 210 performs the immediate data management actions. This process continues until the complete set of metadata 228 for the storage devices 222 of the cluster is analyzed. Once the complete set of metadata 228 for the storage devices 222 is analyzed, the data management engine 210 identifies a set of comprehensive data management actions to perform. Identifying a set of comprehensive data management actions can include performing rankings and/or comparisons of data management actions, values in summary metadata 228, and so on. The data management engine 210 also implements the set of comprehensive data management actions.

Figure 3:
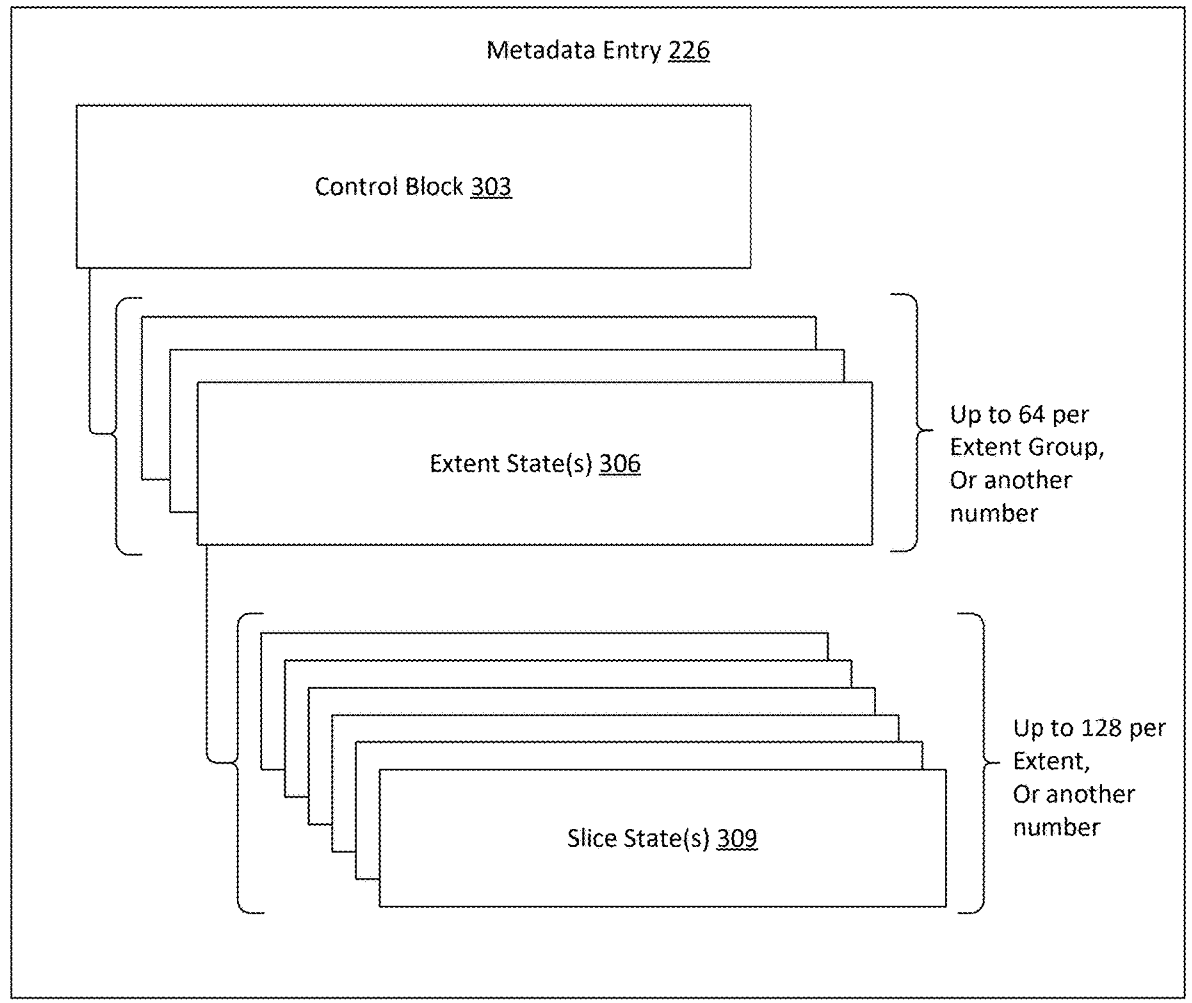
FIG. 3 illustrates an example of a metadata entry, according to various embodiments.

FIG. 3 illustrates an example of a metadata entry 300, according to various embodiments. The metadata entry 300 includes, without limitation, a control block 303, one or more extent states 306, and one or more slice states 309.

An extent group refers to a group of up to a predetermined number (e.g., up to 4, 5, 12, 64, or any other number) data units or "extents" of data. Each extent includes up to a predetermined number (e.g., up to 4, 5, 12, 64, 128) or any other number) of data subunits or "slices" of data. The metadata entry 300 includes metadata that records values for a number of parameters that describe the extent group. In some examples, metadata entry 300 includes exactly one control block 303. The metadata entry 300 includes a predetermined number of extent states 306 that describe corresponding extents of the extent group. Because the metadata entry 300 in this example is specific to an extent group, the number of extents for the extent group matches the number of extent states 306 in the metadata entry 300. The metadata entry 300 also includes a predetermined number of slice states 309 that describe corresponding slices of each extent. As a result, the metadata entry 300 includes a number of slice states 309 per extent state 306, and another total number of slice states 309.

A control block 303 includes control information corresponding to an overall extent group. A control block 303 includes physical storage location data for the extent group, a listing, array, or other structure that indicates a set of extent identifiers (e.g., slice group identifiers) corresponding to extents of the extent group. An extent state 306 includes information corresponding to a particular extent. An extent state 306 includes an extent identifier, physical storage location data for the extent, and a listing, array, or other structure that indicates a set of slice identifiers corresponding to slices of the extent. A slice state 309 includes information corresponding to a particular extent, such as a slice identifier and physical storage location data for the slice. Additional information regarding control blocks 303, extent states 306, and slice states 309 is provided with respect to FIG. 4

Figure 4:
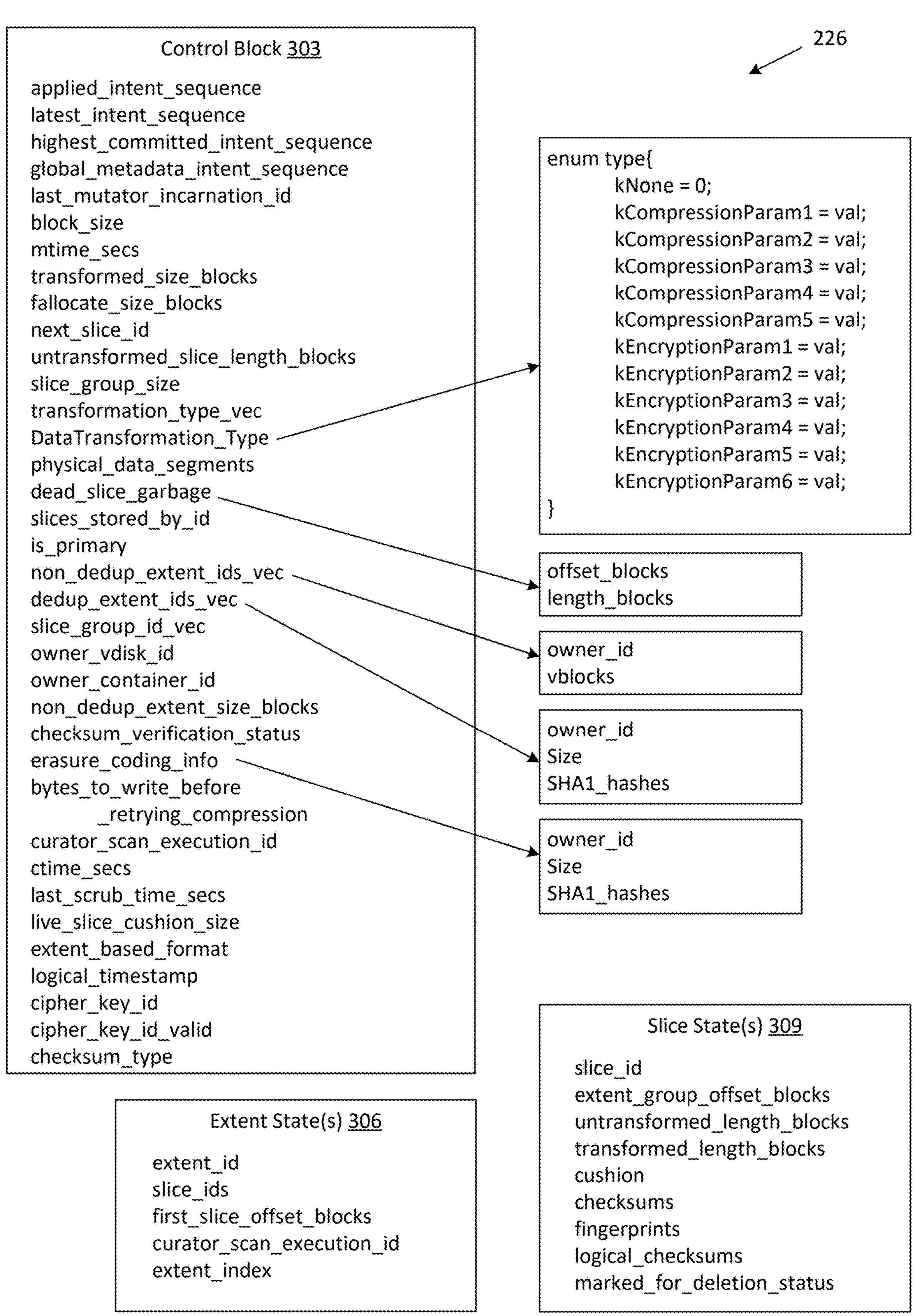
FIG. 4 illustrates an example of metadata components, according to various embodiments.

FIG. 4 illustrates an example of metadata components of a metadata entry 300, according to various embodiments. The metadata entry 300 includes, without limitation, a control block 303, one or more extent states 306, and one or more slice states 309.

The control block 303 includes a set of parameters corresponding to an overall extent group. For example, the control block 303 shown stores one or more values for various parameters or information structures that include, without limitation, applied intent sequence, latest intent sequence, highest committed intent sequence, global metadata intent sequence, last mutator incarnation identifier, block size, time parameter in seconds or another measure of time, transformed size blocks, fallocate (e.g., allocation command) size blocks, next slice identifier, untransformed slice length blocks, slice group size, transformation type vector, data transformation type, physical data segments, dead slice garbage, slices stored by identifier, indication of whether data or a partition is primary, non deduplicated extent identifiers vector, deduplicated extent identifiers vector, slice group (or extent) identifiers vector, owner of virtual disk identifier, owner of container identifier, non deduplicated extent size blocks, checksum verification status, erasure coding information, bytes to write before retrying compression, curator scan execution identifier, ctime in seconds (e.g., time since metadata change or time of last metadata change), last scrub time secs (e.g., time since data scrub or time of last data scrub), live slice cushion size, extent based format, logical timestamp, cipher key identifier, cipher key identifier valid indicator, checksum type, and so on.

The data transformation type information indicates one or more compression configuration parameters and one or more encryption configuration parameters for the data of the extent group. The dead slice garbage information has one or more values for various parameters that include, without limitation, an offset blocks parameter and length blocks parameter. The non deduplicated extent identifiers vector has one or more values for various parameters that include, without limitation, power identifier and virtual blocks.

The deduplicated extent identifiers vector has one or more values for various parameters that include, without limitation, owner identifier, size, and SHA1_hashes (or another type of hash) for deduplicated extents. The erasure coding information has one or more values for various parameters that include, without limitation, owner identifier, size, and SHA1_hashes (or another type of hash) for erasure.

An extent state 306 includes information corresponding to a particular extent. An example extent state 306 is shown having one or more values for various parameters that include, without limitation, extent identifier, slice identifiers, first set offset blocks, curator scan execution identifier, and extent index.

A slice state 309 includes information corresponding to a particular extent, such as a slice identifier and physical storage location data for the slice. An example slice state 309 is shown having one or more values for various parameters that include, without limitation, slice identifier, extent group offset blocks, untransformed (e.g., uncompressed, unencrypted) length blocks, transformed (e.g., uncompressed, unencrypted) length blocks, cushion, checksums, fingerprints, logical checksums, and marked for deletion status.

In a conventional system, all of these metadata parameters would have to be read and analyzed for all data in a cluster in order to make appropriate decisions about the data management actions should be performed in the cluster. This reading and analysis process consumes a significant amount of time and computing resources. For example, in the case of a garbage collection process on storage-heavy clusters, the scanning of the metadata often takes more time than the actual data management actions that are subsequently performed. In such a scenario, the scan of the metadata becomes a bottleneck and slows the data management actions, which cause performance of the data storage cluster to suffer.

Figure 5:
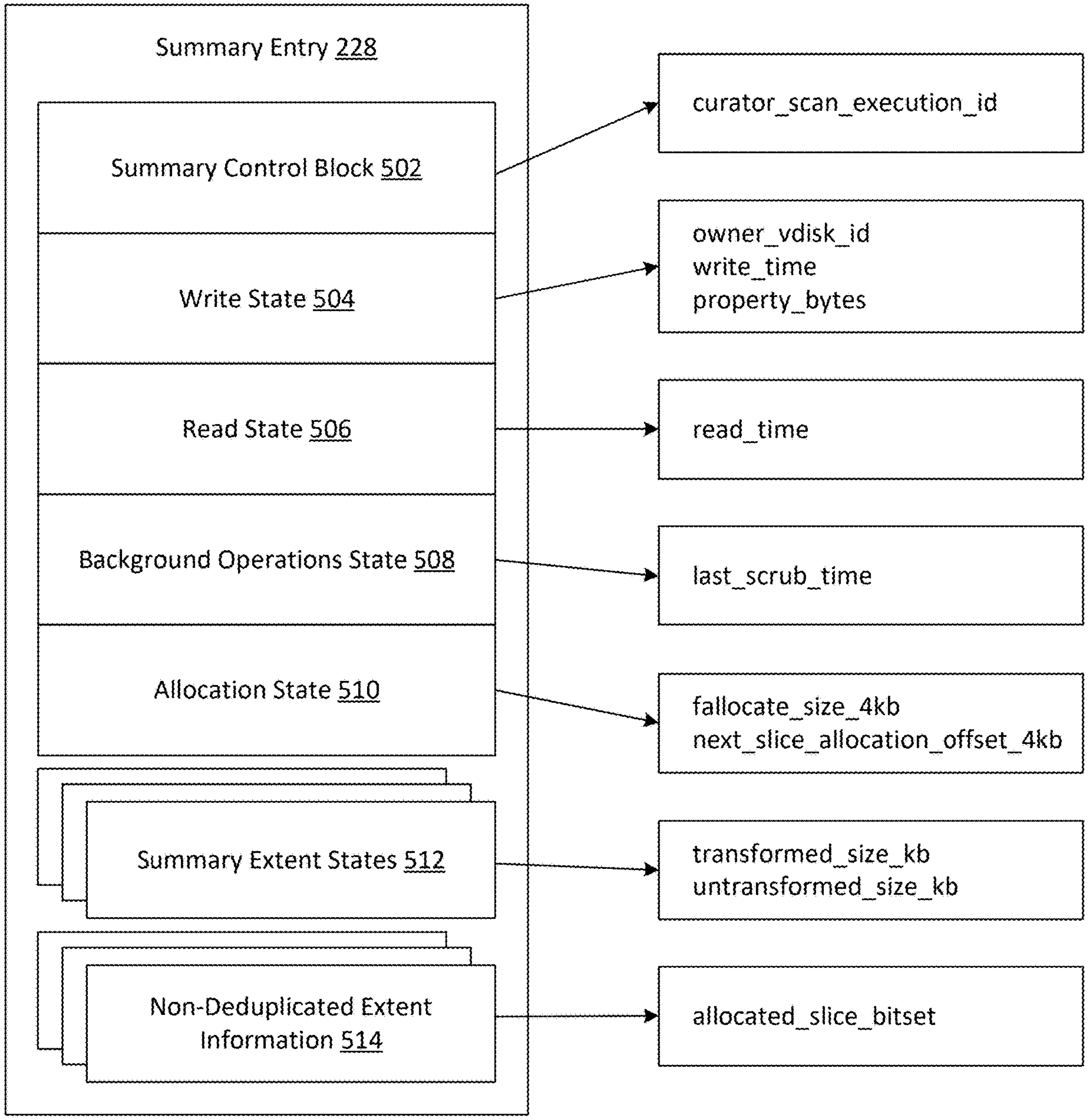
FIG. 5 illustrates an example of a summary entry, according to various embodiments.

FIG. 5 illustrates an example of a summary entry 500, according to various embodiments. The summary entry 500 includes, without limitation, a summary control block 502, a write state 504, a read state 506, a background operations state 508, an allocation state 510, summary extent states 512, and non-deduplicated extent state information 514.

The summary control block 502 includes a set of parameters corresponding to an overall extent group. The summary control block 502 includes a limited subset of metadata from the control block 303, or other area(s) of a metadata entry 300 corresponding to a same set of data locations as the summary entry 500. In the example shown, the summary control block 502 includes a curator (e.g., data management) scan execution identifier. The curator scan execution identifier indicates an identifier indicating a particular data management scanning process of the data management engine 210. A particular scanning process of the data management engine 210 accounts for a complete set of data in the cluster, so a complete set of summary entries 500 are scanned during the process. The data management engine 210 uses the curator scan execution identifier to determine whether a particular summary entry 500 and its related data in the cluster has been accounted for in a current scanning process. While the curator scan execution identifier can be copied from a metadata entry 300, in some cases the metadata processing engine 208 or the data management engine 210 enters and/or updates the curator scan execution identifier based on the current scanning process of the data management engine 210.

For example, as the data management engine 210 scans the summary entries 500, the metadata processing engine 208 can be updating some of the summary entries 500 at the same time. The data management engine 210 uses the summary control block 502 and the curator scan execution identifier to determine whether the summary entry 500 is updated after the scan started. If the summary entry 500 indicates a curator scan execution identifier that is the same as the active scan, then the data management engine 210 can determine that the summary entry 500 is updated after the scan started, and can ignore the summary entry 500.

The write state 504 includes a set of parameters corresponding to an overall extent group. The write state 504 includes an identifier for an owner of the virtual disk. The data management engine 210 uses write state 504 to provide context for the data therein. In some cases, the data management engine 210 uses this owner identifier to identify owner-specific rules that map data management actions to metadata parameters in the various summary entries 500, storage parameters, and so on.

The write state 504 includes a write time such as a most recent write time of the extent group. The data management engine 210 uses the write time to determine data movement or life cycle decisions such as whether to move the corresponding data to another storage device 222 that has a faster or slower read/write speed and/or a shorter or longer access time relative to that of the current storage device 222. More recent write times can indicate to move the data to another storage device 222 that has a faster read/write speed and/or a shorter access time (e.g., moving from an HDD to an SSD or a higher quality HDD). Older write times can indicate to move the data to another storage device 222 that has a slower read/write speed and/or a longer access time (e.g., moving from an SSD to an HDD or a lower quality SSD).

The write state 504 includes a property bytes parameter that indicates a format or property describing a manner in which the data is stored (e.g., Advanced Encryption Standard (AES) vs non-AES). In most cases, the data management engine 210 does not use the property bytes parameter for a particular data management action, but rather uses the property bytes parameter to determine format-specific instructions to perform the data management action that is identified based on other parameters.

The read state 506 includes a read time, for example, a most recent read time for the overall extent group. The data management engine 210 uses the read time to determine data movement or life cycle decisions such as whether to move the corresponding data to another storage device 222 that has a faster or slower read/write speed and/or a shorter or longer access time relative to that of the current storage device 222. More recent read times can indicate to move the data to another storage device 222 that has a faster read/write speed and/or a shorter access time (e.g., moving from an HDD to an SSD or a higher quality HDD). Older read times can indicate to move the data to another storage device 222 that has a slower read/write speed and/or a longer access time (e.g., moving from an SSD to an HDD or a lower quality SSD).

The background operations state 508 includes a last scrub time for the overall extent group. The data management engine 210 uses the scrub time to determine data management actions such as whether to transmit a command to scrub the data. Data scrubbing includes integrity verification and/or attempting to correct the data. For example, a scrubbing process can include reading the data to determine whether the data is complete, correct, accurately formatted, and/or repeated. A scrubbing process can also include modifying and/or removing incomplete, incorrect, inaccurately formatted, and/or repeated data. The background operations state 508 can also include a scrub status or result, indicating whether the data is verified as correct and/or corrected through scrubbing. If the status indicates the data is corrupt, then the data management engine 210 can use this to move and/or delete the corrupted data.

The allocation state 510 includes an allocation size of the overall extent group. The allocation size can be indicated in chunks of 4 kb granularity or another measure of data size. While an extent group can have a particular maximum size (e.g., up to 4 MB if each extent is up to 1 MB), the amount or size of allocated data can be another value that is less than or equal to the maximum size. The allocation size parameter can indicate how much data is actually allocated to the overall extent group. The data management engine 210 can use the allocation size to determine whether to increase the allocated size of the extent group, its extents, and/or its slices. For example, if the allocated slice bit-set data of the non-deduplicated extent information 514 indicates that the slices show an increase in used or written (e.g., non-zero) data bits, then the data management engine 210 can increase the allocated size of the extent group, its extents, and/or its slices. If the non-deduplicated extent information 514 indicates a decrease in used or written data bits, then the data management engine 210 can decrease the allocated size of the extent group, its extents, and/or its slices.

The allocation state 510 includes a next slice allocation offset parameter. In this example, the next slice allocation offset can be indicated in 4 kb groups or another measure of data size. The next slice allocation offset can indicate an offset for the next slice as an indication of unused space. The data management engine 210 can use the next slice allocation offset or other indication of unused space in order to identify a relative impact of a garbage collection action or another data management action. The data management engine 210 performs a cost-benefit analysis based on the indication of unused space and the allocation size to identify the impact of a particular action. The data management engine 210 can identify the difference and/or ratio between allocation size and unused space for each of a number of extent groups, prioritize these values to determine which extent group(s) to perform various action(s) against (e.g., once a complete set of summary entries 500 for the cluster is analyzed). For example, a particular extent group corresponding to the summary entry 500 can currently be marked as invalid (that is, capable of being deleted in whole or in part according to extent and/or slice). The data management engine 210 can identify whether to actually reclaim data based on the indication of unused space and the allocation size. In some examples, the summary entry 500 can include one or more parameters that indicate whether an extent group, extent, or slice is marked as invalid.

The summary entry 500 contains multiple instances of extent-specific summary extent states 512. A summary extent state 512 is stored for each extent in the extent group of the summary entry 500. The summary extent state 512 includes a transformed size and an untransformed size (e.g., in kb or another measure of data size). The data management engine 210 can use the transformed size and untransformed size in order to identify a relative impact of a garbage collection action or another data management action. The data management engine 210 performs a cost-benefit analysis based on the transformed size and untransformed size to identify the impact of a particular action. The data management engine 210 can identify the difference and/or ratio between transformed size and untransformed size for each of a number of extent groups, prioritize these values to determine which extent group(s) to perform various action(s) against (e.g., once a complete set of summary entries 500 for the cluster is analyzed). The data management engine 210 can identify whether to actually reclaim data marked as invalid based on the transformed size and untransformed size.

The summary entry contains multiple instances of extent-specific non-deduplicated extent information 514. Non-deduplicated extent information 514 is stored for each extent in the extent group of the summary entry 500. Non-deduplicated extent information 514 includes allocated slice bit-set data. The allocated slice bit-set is a bitmap of allocated slices in the extent. The allocated slice bit-set provides a compact representation of what data is physically allocated (e.g., to one or more physical addresses). Each bit in a value for the allocated slice bit-set parameter indicates whether a predetermined subset of an extent (e.g., an amount of data corresponding to a slice size) has data written therein. The data management engine 210 performs compares the allocated slice bit-set data to what is logically allocated (e.g., to one or more logical or virtual addresses). The data management engine 210 uses the allocated slice bit-set to enable partial-extent garbage collection of unused or unwritten slices as indicated by the bits in the allocated slice bit-set data. The data management engine 210 identifies slice-level garbage collection actions based on the allocated slice bit-set data.

Figure 6:
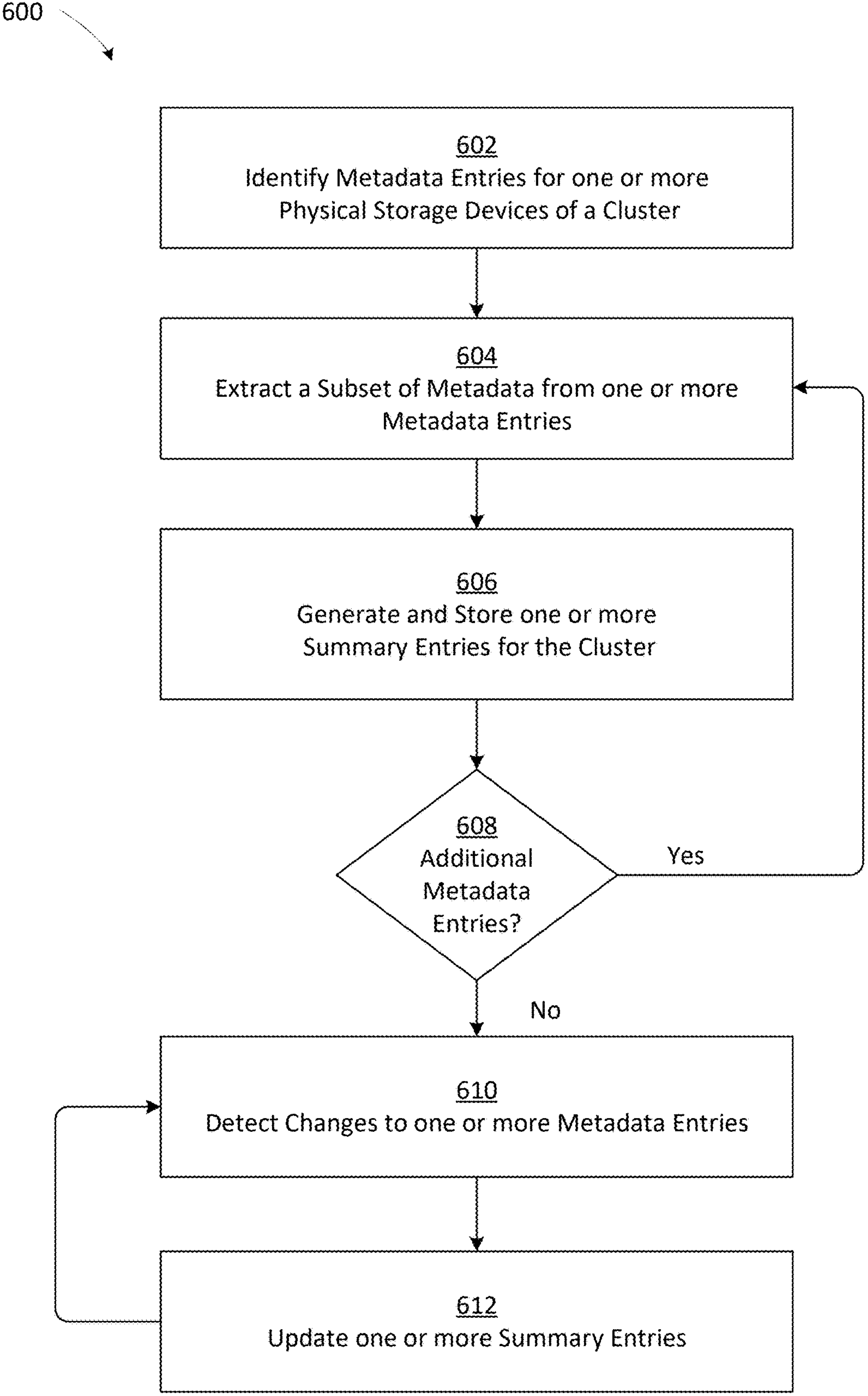
FIG. 6 is a flow diagram of method steps for processing metadata to generate summary, according to various embodiments.

FIG. 6 is a flow diagram of method steps for processing metadata to generate summary metadata, according to various embodiments. Although the method steps are described in conjunction with the systems of FIGS. 1-2 and the metadata of FIG. 3-5, persons of ordinary skill in the art will understand that any system configured to perform the method steps, in any order, is within the scope of the invention.

As shown, a method 600 begins at step 602, where the metadata processing engine 208 identifies a metadata entry 300 for a physical storage device 222. The metadata processing engine 208 can maintain an metadata entry 300 for a subset of data in a cluster such as an extent group. The extent group includes a logical grouping of data that includes a number of data units such as extents.

At step 604, the metadata processing engine 208 extracts a subset of the metadata 226 from the metadata entry 300. The metadata processing engine 208 includes a predetermined list of parameters to extract from the metadata entry 300. The metadata processing engine 208 reads the metadata entry 300 and extracts the predetermined list of parameters. In some examples, the predetermined list of parameters is based on parameters used by and/or referenced in a set of data management rules of the data management engine 210.

At step 606, the metadata processing engine 208 generates and stores a summary entry 500. The metadata processing engine 208 generates the summary entry 500 based on the metadata entry 300. The metadata processing engine 208 stores the summary entry 500 as a quantized or summarized metadata entry corresponding to the metadata entry 300. In some examples, the summary entry 500 includes or is limited to information that is used by and/or referenced in a set of data management rules of the data management engine 210. In some examples, generating the summary entry 500 includes directly storing the extracted subset of the metadata 226 from the metadata entry 300. However, the metadata processing engine 208 can also process the various values for extracted parameters to generate one or more of the parameters for the summary entry 500.

At step 608, the metadata processing engine 208 determines whether there are additional metadata entries 300 to scan. The metadata processing engine 208 tracks a set of metadata entries 300 corresponding to extent groups or other groups of data units for a data cluster. The metadata processing engine 208 generates a set of summary entries 500 parallel to the "full" metadata entries 300, so that the data management engine 210 saves processing power, time, and energy relative to other technologies, while still maintaining the full metadata entries 300 for uses other than data management. If there are additional metadata entries 300 to scan in a metadata datastore 224, the metadata processing engine 208 moves back to step 604 and extracts a subset of metadata from another metadata entry 300. Otherwise, if a complete set of metadata entries 300 in a metadata datastore 224 is accounted for, then the metadata processing engine 208 moves to step 610.

At step 610, the metadata processing engine 208 detects changes to one or more metadata entries 300. Once the metadata processing engine 208 has created a set of summary entries 500 parallel to the "full" metadata entries 300, the metadata processing engine 208 is capable of ensuring that the summary entries 500 are updated in an efficient manner. Rather than periodically re-scanning the complete set of metadata entries 300, the metadata processing engine 208 determines whether one or more metadata entries 300 have been updated. Whenever an overall management system identifies changes in data, a process of that overall management system updates one or more corresponding metadata entries 300. The metadata processing engine 208 monitors physical data locations of the metadata entries to detect these changes in the metadata entries 300. At step 612, the metadata processing engine 208 updates and stores a summary entry 500. The metadata processing engine 208 generates a summary entry 500 based on the metadata entry 300.

At step 612, the metadata processing engine 208 updates one or more summary entries 500. The metadata processing engine 208 updates the one or more summary entries 500 based on the updated one or more metadata entries 300. The metadata processing engine 208 stores one or more updated summary entries 500 as a quantized or summarized metadata entry corresponding to the metadata entry 300, as discussed above with reference to step 606. Once the metadata processing engine 208 updates the summary entries 500 corresponding to the updated metadata entries 300, the process moves to step 610 and monitors for additional changes to the metadata entries 300.

Figure 7:
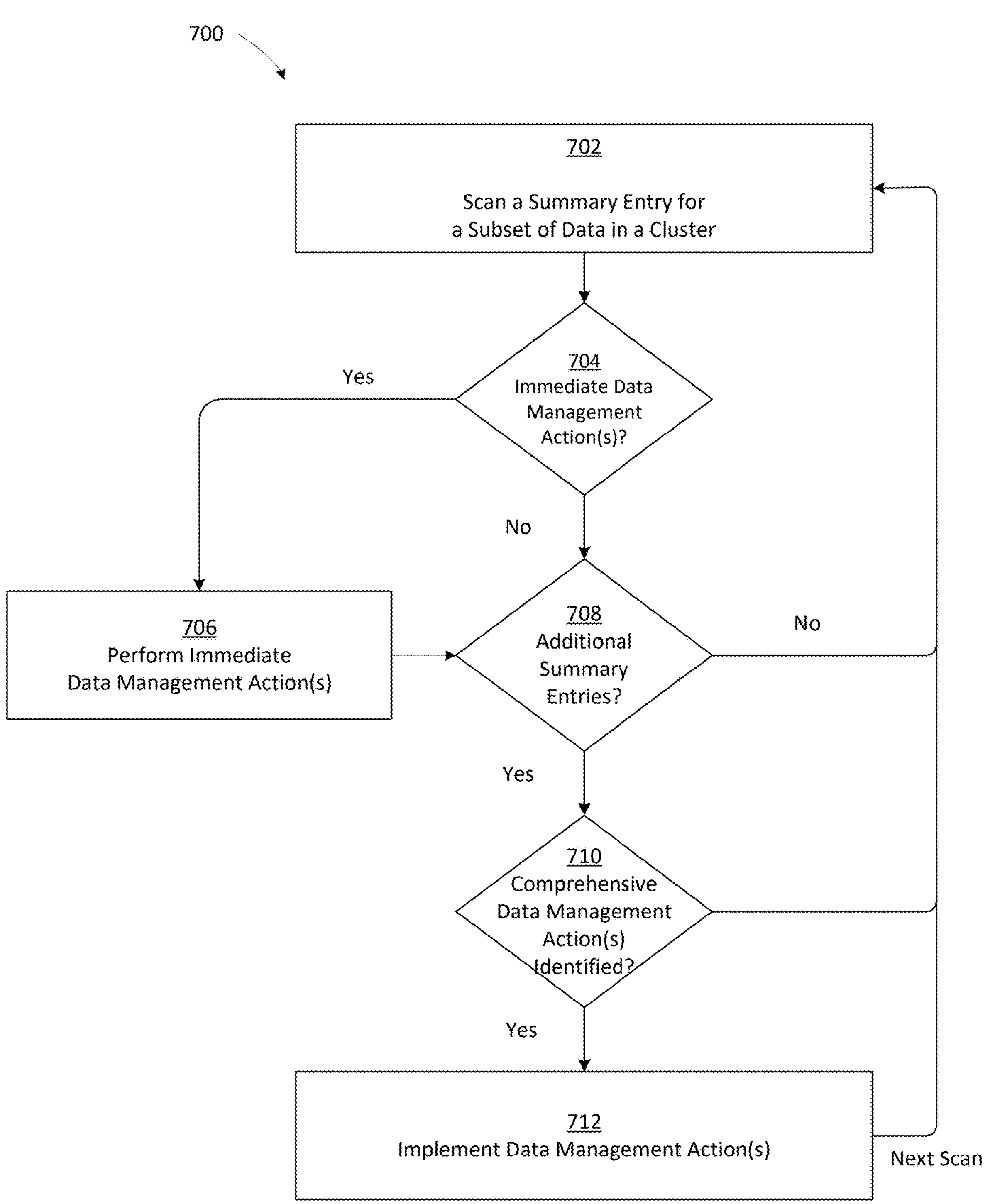
FIG. 7 is a flow diagram of method steps for performing a data management action, according to various embodiments.

FIG. 7 is a flow diagram of method steps for performing a data management action, according to various embodiments. Although the method steps are described in conjunction with the systems of FIGS. 1-2 and the metadata of FIGS. 3-5, persons of ordinary skill in the art will understand that any system configured to perform the method steps, in any order, is within the scope of the invention.

As shown, a method 700 begins at step 702, where the data management engine 210 scans a summary entry 500 for a subset of data a cluster. In some examples, the summary entry 500 corresponds to an extent group or another logical grouping of data units such as extents. The data management engine 210 generally reads the summary entry 500 and identifies one or more data management actions based on the values of parameters indicated in the metadata, and the storage parameters for the storage devices 222. The one or more data management actions correspond to garbage collection, lifecycle management, and any other movement, flagging, allocation, reallocation, reclaiming, and/or deletion actions. The one or more data management actions include immediate data management actions and/or comprehensive data management actions.

At step 704, the data management engine 210 determines whether the one or more data management actions includes any immediate data management actions. Immediate data management actions include data management actions that are permitted, for example by rules of the data management engine 210, to be completed before the complete set of summary entries 500 for a cluster are analyzed. If there are one or more immediate data management actions, the process moves to step 706. Otherwise, if there are no immediate data management actions, the process moves to step 708.

At step 706, the data management engine 210 performs the immediate data management actions. The data management engine 210 performs the immediate data management actions prior to scanning or analyzing the complete set of summary entries 500 for a cluster. However, it is possible to perform "immediate" data management actions at any time. For example, if a final summary entry 500 scanned by the data management engine has metadata that maps to an immediate data management action, that action is performed after the scan of that final summary entry 500. The immediate data management actions include data management actions that are capable of being performed on data in a storage device 222 without moving other data, such as garbage collection actions and moving data to a currently unallocated physical location of a storage device 222.

At step 708, the data management engine 210 determines whether there are additional summary metadata entries 500 to scan. The data management engine 210 tracks a set of summary entries 500 corresponding to extent groups or other groups of data units for a data cluster. The summary entries 500 scans a complete set of the summary entries 500 in a metadata datastore 224 in order to make more comprehensive data management decisions. If there are summary entries 500 to scan in a metadata datastore 224, the data management engine 210 moves back to step 702 and continues to scan the summary entries 500. Otherwise, if the complete set summary entries 500 in a metadata datastore 224 are accounted for, then the data management engine 210 moves to step 710.

At step 710, the data management engine 210 determines whether comprehensive data management actions are identified. The comprehensive data management actions include any data management actions other than immediate data management actions. Comprehensive data management actions include data management actions that are identified based on comparisons between data management actions, ranking of data management actions, and so on. Identifying a set of comprehensive data management actions include performing rankings and/or comparisons of data management actions, values in summary entries 500, and so on.

At step 712, the data management engine 210 performs the set of comprehensive data management actions. In some examples, the data management engine 210 performs the set of comprehensive data management actions in a predetermined order that enables the full set of actions to be performed without data loss. The data management actions can include multiple data relocation actions. In one example, a first data movement action moves data from a first physical location to a second physical location that is unallocated or is allocated to data marked for garbage collection. A second data movement action moves data from a third physical location to the first physical location.

The data management actions cause a component of a data management service to update corresponding metadata entries 300. The metadata processing engine 208 and the data management engine 210 can also be components of the data management service. The metadata processing engine 208 detects these changes and updates the summary entries 500, for example, as discussed at step 610 of FIG. 6.

Once the data management engine 210 performs the set of comprehensive data management actions, the process moves to step 702 and starts a next full scan of the summary entries 500. The data management engine 210 indicates the new scan by updating or incrementing a scan execution identifier. The data management engine 210 or the metadata processing engine 208 updates scanned summary entries 500 to include the updated scan execution identifier.

In sum, the disclosed techniques enable faster and more efficient data management actions by leveraging summary entries to analyze data in a storage cluster, rather than using the full metadata entries. The disclosed techniques include storing and maintaining parallel sets of metadata entries for data in the storage cluster. The parallel sets of metadata entries include both a set of metadata entries for the data in the storage cluster and a set of summary entries for the data in the storage cluster. The system identifies metadata entries for storage devices in a cluster, and extracts a subset of metadata from each metadata entry to generate a corresponding summary entry. This summary entry generation process generates summary entries for the data in the storage cluster, and stores the summary entries along with the metadata entries. As metadata in the is updated, the system detects these changes and updates the summary metadata in the summary entries. The disclosed techniques further include efficient data management processing by scanning the summary entries rather than scanning the full metadata entries when performing certain data management actions, such as garbage collection and life cycle management. The summary entry for each metadata entry is used to make decisions regarding the data management actions. This process continues until a complete set of the summary entries are scanned. The system then performs the data management actions.

At least one technical advantage of the disclosed techniques relative to prior art is that, with the disclosed techniques, data management actions, such as garbage collection processes, can be performed faster and using fewer computing resources, enabling data management of clusters that store a greater amount of data relative to other technologies. These technical advantages provide one or more technological improvements over prior art approaches.

Aspects of the subject matter described herein are set out in the following numbered clauses.

1. In some embodiments, one or more non-transitory computer readable media store instructions that, when executed by one or more processors, cause the one or more processors to perform the steps of in response to a metadata entry associated with storage of data in a cluster being modified, generating a summary entry corresponding to the metadata entry, the summary entry comprising a subset of information from the metadata entry, and performing a data management action based upon a scanning process that reads a plurality of summary entries corresponding to a plurality of metadata entries for data in the cluster.

2. The one or more non-transitory computer readable media of clause 1, wherein generating the summary entry comprises storing control block metadata into the summary entry, the control block metadata comprising a scan execution identifier for a scan of a plurality of summary entries for the data in the cluster.

3. The one or more non-transitory computer readable media of clauses 1 or 2, wherein generating the summary entry comprises including a summary extent state to the summary entry for each of a plurality of extents in the metadata entry, the summary extent state specifying a transformed size of the extent and an untransformed size of the extent.

4. The one or more non-transitory computer readable media of any of clauses 1-3, wherein generating the summary entry comprises omitting per-slice information of the data present in the metadata entry from the summary entry, the per-slice information comprising information about a particular slice in an extent group of the data.

5. The one or more non-transitory computer readable media of any of clauses 1-4, wherein generating the summary entry comprises including a write state and a read state in the metadata entry corresponding to an extent group from the data in the summary entry.

6. The one or more non-transitory computer readable media of any of clauses 1-5, wherein a size of the summary entry is less than a size of the metadata entry.

7. The one or more non-transitory computer readable media of any of clauses 1-6, wherein the data management action is performed based on the plurality of summary entries instead of the plurality of metadata entries.

8. The one or more non-transitory computer readable media of any of clauses 1-7, wherein the data management action comprises a garbage collection process that deletes unused extent groups from the data that are consuming storage in the cluster.

9. The one or more non-transitory computer readable media of any of clauses 1-8, wherein the data management action comprises a data movement decision relating to storage of data in the cluster.

10. The one or more non-transitory computer readable media of any of clauses 1-9, wherein the summary entry comprises one or more elements selected from a group consisting of a control block, a write state, a read state, an allocation state, a background operations state, a transformed size, an untransformed size or an allocated slice bit-set for an extent.

11. The one or more non-transitory computer readable media of any of clauses 1-10, wherein the data management action is an immediate data management action that is performed prior to completion of the scanning process, wherein the scanning process scans the summary entry for each metadata entry for the data in the cluster.

12. The one or more non-transitory computer readable media of any of clauses 1-11, wherein the data management action is a comprehensive data management action performed based on completion of the scanning process, wherein the scanning process scans the summary entry for each metadata entry for the data in the cluster.

13. In some embodiments, a computer-implemented method comprises in response to a metadata entry associated with storage of data in a cluster being modified, generating a summary entry corresponding to the metadata entry, the summary entry comprising a subset of information from the metadata entry, and performing a data management action based upon a scanning process that reads all of a plurality of summary entries corresponding to a plurality of metadata entries for all data in the cluster.

14. The computer-implemented method of clause 13, wherein generating the summary entry comprises storing control block metadata into the summary entry, the control block metadata comprising a scan execution identifier for a scan of a plurality of summary entries for the data in the cluster.

15. The computer-implemented method of clauses 13 or 14, wherein generating the summary entry comprises including a summary extent state to the summary entry for each of a plurality of extents in the metadata entry, the summary extent state specifying a transformed size of the extent and an untransformed size of the extent.

16. The computer-implemented method of any of clauses 13-15, wherein generating the summary entry comprises omitting per-slice information of the data present in the metadata entry from the summary entry, the per-slice information comprising information about a particular slice in an extent group of the data.

17. The computer-implemented method of any of clauses 13-16, wherein generating the summary entry comprises including a write state and a read state in the metadata entry corresponding to an extent group from the data in the summary entry.

18. The computer-implemented method of any of clauses 13-17, wherein a size of the summary entry is less than a size of the metadata entry.

19. The computer-implemented method of any of clauses 13-18, wherein the data management action is performed based on the plurality of summary entries instead of the plurality of metadata entries.

20. The computer-implemented method of any of clauses 13-19, wherein the data management action comprises a garbage collection process that deletes unused extent groups from the data that are consuming storage in the cluster.

21. The computer-implemented method of any of clauses 13-20, wherein the data management action comprises a data movement decision relating to storage of data in the cluster.

22. The computer-implemented method of any of clauses 13-21, wherein the summary entry comprises one or more elements selected from a group consisting of a control block, a write state, a read state, an allocation state, a background operations state, a transformed size, an untransformed size or an allocated slice bit-set for an extent.

23. The computer-implemented method of any of clauses 13-22, wherein the data management action is an immediate data management action that is performed prior to completion of the scanning process, wherein the scanning process scans the summary entry for each metadata entry for the data in the cluster.

24. The one or more non-transitory computer readable media of any of clauses 13-23, wherein the data management action is a comprehensive data management action performed based on completion of the scanning process, wherein the scanning process scans the summary entry for each metadata entry for the data in the cluster.

25. In some embodiments, a system comprises a first computing device, memory storing instructions, and one or more processors coupled to the memory and, when executing the instructions, are configured to perform operations comprising in response to a metadata entry associated with storage of data in a cluster being modified, generating a summary entry corresponding to the metadata entry, the summary entry comprising a subset of information from the metadata entry, and performing a data management action based upon a scanning process that reads all of a plurality of summary entries corresponding to a plurality of metadata entries for all data in the cluster.

26. The system of clause 25, wherein generating the summary entry comprises storing control block metadata into the summary entry, the control block metadata comprising a scan execution identifier for a scan of a plurality of summary entries for the data in the cluster.

27. The system of clauses 25 or 26, wherein generating the summary entry comprises including a summary extent state to the summary entry for each of a plurality of extents in the metadata entry, the summary extent state specifying a transformed size of the extent and an untransformed size of the extent.

28. The system of any of clauses 25-27, wherein generating the summary entry comprises omitting per-slice information of the data present in the metadata entry from the summary entry, the per-slice information comprising information about a particular slice in an extent group of the data.

29. The system of any of clauses 25-28, wherein generating the summary entry comprises including a write state and a read state in the metadata entry corresponding to an extent group from the data in the summary entry.

30. The system of any of clauses 25-29, wherein a size of the summary entry is less than a size of the metadata entry.

31. The system of any of clauses 25-30, wherein the data management action is performed based on the plurality of summary entries instead of the plurality of metadata entries.

32. The system of any of clauses 25-31, wherein the data management action comprises a garbage collection process that deletes unused extent groups from the data that are consuming storage in the cluster.

33. The system of any of clauses 25-32, wherein the data management action comprises a data movement decision relating to storage of data in the cluster.

34. The system of any of clauses 25-33, wherein the summary entry comprises one or more elements selected from a group consisting of a control block, a write state, a read state, an allocation state, a background operations state, a transformed size, an untransformed size or an allocated slice bit-set for an extent.

35. The system of any of clauses 25-34, wherein the data management action is an immediate data management action that is performed prior to completion of the scanning process, wherein the scanning process scans the summary entry for each metadata entry for the data in the cluster.

36. The system of any of clauses 25-35, wherein the data management action is a comprehensive data management action performed based on completion of the scanning process, wherein the scanning process scans the summary entry for each metadata entry for the data in the cluster.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

Flowcharts and block diagrams in the figures illustrate the architecture, functionality, and operation of possible implementations of systems, methods, and computer program products according to various embodiments of the present disclosure. In this regard, each block in flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer readable media storing instructions that, when executed by one or more processors, cause the one or more processors to perform the steps of:

monitoring, by a metadata processing engine, one or more metadata entries in a metadata datastore, wherein the one or more metadata entries comprises metadata describing data stored in a cluster;

in response to the metadata processing engine detecting, based on the monitoring, that a metadata entry for a portion of the data in the cluster is modified, generating and storing, in the metadata datastore, a summary entry corresponding to the metadata entry, the summary entry comprising a subset of information extracted from the metadata entry by the metadata processing engine; and performing, by a data management engine, a data management action based upon a scanning process that reads a plurality of summary entries corresponding to a plurality of metadata entries for data in the cluster.

2. The one or more non-transitory computer readable media of claim 1, wherein generating the summary entry comprises:

storing control block metadata into the summary entry, the control block metadata comprising a scan execution identifier for a scan of the plurality of summary entries for the data in the cluster.

3. The one or more non-transitory computer readable media of claim 1, wherein generating the summary entry comprises:

including a summary extent state to the summary entry for each of a plurality of extents in the metadata entry, the summary extent state specifying a transformed size of the extent and an untransformed size of the extent.

4. The one or more non-transitory computer readable media of claim 1, wherein generating the summary entry comprises:

omitting per-slice information of the data present in the metadata entry from the summary entry, the per-slice information comprising information about a particular slice in an extent group of the data.

5. The one or more non-transitory computer readable media of claim 1, wherein generating the summary entry comprises:

including a write state and a read state in the metadata entry corresponding to an extent group from the data in the summary entry.

6. The one or more non-transitory computer readable media of claim 1, wherein a size of the summary entry is less than a size of the metadata entry.

7. The one or more non-transitory computer readable media of claim 1, wherein the data management action is performed based on the plurality of summary entries instead of the plurality of metadata entries.

8. The one or more non-transitory computer readable media of claim 1, wherein the data management action comprises a garbage collection process that deletes unused extent groups from the data that are consuming storage in the cluster.

9. The one or more non-transitory computer readable media of claim 1, wherein the data management action comprises a data movement decision relating to storage of data in the cluster.

10. The one or more non-transitory computer readable media of claim 1, wherein the summary entry comprises one or more elements selected from a group consisting of: a control block, a write state, a read state, an allocation state, a background operations state, a transformed size, an untransformed size or an allocated slice bit-set for an extent.

11. The one or more non-transitory computer readable media of claim 1, wherein the data management action is an immediate data management action that is performed prior to completion of the scanning process, wherein the scanning process scans the summary entry for each metadata entry for the data in the cluster.

12. The one or more non-transitory computer readable media of claim 1, wherein the data management action is a comprehensive data management action performed based on completion of the scanning process, wherein the scanning process scans the summary entry for each metadata entry for the data in the cluster.

13. A computer-implemented method, comprising:

monitoring, by a metadata processing engine, one or more metadata entries in a metadata datastore, wherein the one or more metadata entries comprises metadata describing data stored in a cluster;

in response to the metadata processing engine detecting, based on the monitoring, that a metadata entry for a portion of the data in the cluster is modified, generating and storing, in the metadata datastore, a summary entry corresponding to the metadata entry, the summary entry comprising a subset of information extracted from the metadata entry by the metadata processing engine; and performing, by a data management engine, a data management action based upon a scanning process that reads a plurality of summary entries corresponding to a plurality of metadata entries for data in the cluster.

14. The computer-implemented method of claim 13, wherein generating the summary entry comprises:

storing control block metadata into the summary entry, the control block metadata comprising a scan execution identifier for a scan of the plurality of summary entries for the data in the cluster.

15. The computer-implemented method of claim 13, wherein generating the summary entry comprises:

including a summary extent state to the summary entry for each of a plurality of extents in the metadata entry, the summary extent state specifying a transformed size of the extent and an untransformed size of the extent.

16. The computer-implemented method of claim 13, wherein generating the summary entry comprises:

omitting per-slice information of the data present in the metadata entry from the summary entry, the per-slice information comprising information about a particular slice in an extent group of the data.

17. The computer-implemented method of claim 13, wherein generating the summary entry comprises:

including a write state and a read state in the metadata entry corresponding to an extent group from the data in the summary entry.

18. The computer-implemented method of claim 13, wherein a size of the summary entry is less than a size of the metadata entry.

19. The computer-implemented method of claim 13, wherein the data management action is performed based on the plurality of summary entries instead of the plurality of metadata entries.

20. The computer-implemented method of claim 13, wherein the data management action comprises a garbage collection process that deletes unused extent groups from the data that are consuming storage in the cluster.

21. The computer-implemented method of claim 13, wherein the data management action comprises a data movement decision relating to storage of data in the cluster.

22. The computer-implemented method of claim 13, wherein the summary entry comprises one or more elements selected from a group consisting of: a control block, a write state, a read state, an allocation state, a background operations state, a transformed size, an untransformed size or an allocated slice bit-set for an extent.

23. The computer-implemented method of claim 13, wherein the data management action is an immediate data management action that is performed prior to completion of the scanning process, wherein the scanning process scans the summary entry for each metadata entry for the data in the cluster.

24. The computer-implemented method of claim 13, wherein the data management action is a comprehensive data management action performed based on completion of the scanning process, wherein the scanning process scans the summary entry for each metadata entry for the data in the cluster.

25. A system comprising:

a first computing device;

memory storing instructions; and one or more processors coupled to the memory and, when executing the instructions, are configured to perform operations comprising:

monitoring, by a metadata processing engine, one or more metadata entries in a metadata datastore, wherein the one or more metadata entries comprises metadata describing data stored in a cluster;

in response to the metadata processing engine detecting, based on the monitoring, that a metadata entry for a portion of the data in the cluster is modified, generating and storing, in the metadata datastore, a summary entry corresponding to the metadata entry, the summary entry comprising a subset of information extracted from the metadata entry by the metadata processing engine; and performing, by a data management engine, a data management action based upon a scanning process that reads a plurality of summary entries corresponding to a plurality of metadata entries for data in the cluster.

26. The system of claim 25, wherein generating the summary entry comprises:

storing control block metadata into the summary entry, the control block metadata comprising a scan execution identifier for a scan of the plurality of summary entries for the data in the cluster.

27. The system of claim 25, wherein generating the summary entry comprises:

including a summary extent state to the summary entry for each of a plurality of extents in the metadata entry, the summary extent state specifying a transformed size of the extent and an untransformed size of the extent.

28. The system of claim 25, wherein generating the summary entry comprises:

omitting per-slice information of the data present in the metadata entry from the summary entry, the per-slice information comprising information about a particular slice in an extent group of the data.

29. The system of claim 25, wherein generating the summary entry comprises:

including a write state and a read state in the metadata entry corresponding to an extent group from the data in the summary entry.

30. The system of claim 25, wherein a size of the summary entry is less than a size of the metadata entry.

31. The system of claim 25, wherein the data management action is performed based on the plurality of summary entries instead of the plurality of metadata entries.

32. The system of claim 25, wherein the data management action comprises a garbage collection process that deletes unused extent groups from the data that are consuming storage in the cluster.

33. The system of claim 25, wherein the data management action comprises a data movement decision relating to storage of data in the cluster.

34. The system of claim 25, wherein the summary entry comprises one or more elements selected from a group consisting of: a control block, a write state, a read state, an allocation state, a background operations state, a transformed size, an untransformed size or an allocated slice bit-set for an extent.

35. The system of claim 25, wherein the data management action is an immediate data management action that is performed prior to completion of the scanning process, wherein the scanning process scans the summary entry for each metadata entry for the data in the cluster.

36. The system of claim 25, wherein the data management action is a comprehensive data management action performed based on completion of the scanning process, wherein the scanning process scans the summary entry for each metadata entry for the data in the cluster.

* * * * *